United States Patent
Lai et al.

(10) Patent No.: US 7,279,694 B2
(45) Date of Patent: Oct. 9, 2007

(54) OPTICAL OUTPUT SYSTEM WITH AUTO OPTICAL POWER CONTROL FOR OPTICAL MOUSE

(75) Inventors: Li-Hung Lai, Taichuang (TW); Wen-Sheng Hsieh, Taichuang (TW); Wu-Chung Chiang, Taichuang (TW); Yung-Jane Hsu, Hsinchu (CN); Chang-Ching Yeh, Hsinchu (CN)

(73) Assignees: Higher Way Electronics Co., Ltd., Taichuang (TW); Millenium Communication Co., Ltd., Hsinchu Hsien (TW); Frontend Analog and Digital Technology Corporation, Hsinchu (TW)

( * ) Notice: Subject to any disclaimer, the term of this patent is extended or adjusted under 35 U.S.C. 154(b) by 122 days.

(21) Appl. No.: 11/224,017

(22) Filed: Sep. 13, 2005

(65) Prior Publication Data

US 2007/0057206 A1   Mar. 15, 2007

(51) Int. Cl.
  *G01J 1/32*   (2006.01)
  *H01S 3/13*   (2006.01)
  *G02B 27/00*   (2006.01)

(52) U.S. Cl. .................. 250/551; 250/205; 250/221; 372/29.011; 372/38.02

(58) Field of Classification Search ............. 250/205, 250/221, 551; 372/29.011–29.014, 29.02, 372/29.021, 38.01, 38.02, 38.07; 345/156, 345/163

See application file for complete search history.

(56) References Cited

U.S. PATENT DOCUMENTS

| 6,531,692 B1 | 3/2003 | Adan et al. |
| 2004/0062164 A1* | 4/2004 | Miyamoto et al. ........ 369/53.26 |
| 2004/0264523 A1* | 12/2004 | Posamentier ............. 372/38.01 |

FOREIGN PATENT DOCUMENTS

WO   WO 2004021267   3/2004

OTHER PUBLICATIONS

Darius Mehri, "Chip simulates retina," Design News, Jul. 17, 2000, 2 pages.

\* cited by examiner

*Primary Examiner*—Kevin Pyo
(74) *Attorney, Agent, or Firm*—Volentine & Whitt, PLLC

(57) ABSTRACT

The invention relates to an optical output system with auto optical power control for an optical mouse. The optical output system comprises: a light emitting device, a driver and an auto power controller. The light emitting device is used for generating emitting light. The driver is used for driving the light emitting device. The auto power controller is used for outputting a control signal to the driver according to at least one input signals so as to control the power of the light emitting device at a predetermined range. According to the invention, the optical output system can output the stable power of the emitting light at a predetermined value within the predetermined range under various conduction and circumference by a feedback control. Furthermore, the optical mouse using the optical output system can work on various reflective surface.

17 Claims, 3 Drawing Sheets

OPTICAL OUTPUT SYSTEM WITH AUTO OPTICAL POWER CONTROL FOR OPTICAL MOUSE

BACKGROUND OF THE INVENTION

1. Field of the Invention

The present invention relates to an optical output system, more particularly, an optical output system with auto optical power control for an optical mouse.

2. Description of the Related Art

Referring to FIG. 3, it shows a conventional optical output system 30 for an optical mouse. The conventional optical output system 30 comprises: a light emitting device 31 and a driver 32. The light emitting device 31 is used for generating emitting light. The driver 32 is used for driving the light emitting device 31. At present, the light emitting device 31 is a laser diode for outputting laser light. For safety demand and stable resolution, the output power of the laser light must be controlled to a predetermined value, for example below 1 mW. Therefore, the manufacturer must adjust the driver 32 to obtain the predetermined value of the output power.

Nevertheless, the output power may still be unstable owing to the following reasons:
1. variation of the laser diode (Die-to-Die variation on the laser diode output power under a fixed driving current);
2. variation of the driving current (voltage) source of the laser diode (Die-to-Die driving current variation, Vdd dependence and temperature dependence);
3. temperature dependence of efficiency for transforming electrical power to optical power in the laser diode; and
4. mouse-to-mouse variation of the optical output system in the optical mouse.

Besides, when the output power is adjusted to suit a specific reflective surface assumed by the manufacturer, the optical mouse may not work on another reflective surface. That is, a conventional optical mouse cannot be utilized for all reflective surfaces.

Therefore, it is necessary to provide an optical output system so as to solve the above problem.

SUMMARY OF THE INVENTION

One objective of the present invention is to provide an optical output system with auto optical power control for optical mouse. The optical output system comprises: a light emitting device, a driver and an auto power controller. The light emitting device is used for generating emitting light. The driver is used for driving the light emitting device. The auto power controller is used for outputting a control signal to the driver according to at least one input signals so as to control the power of the light emitting device at a predetermined range.

According to the invention, the optical output system can output the stable power of the emitting light at a predetermined value within the predetermined range under various conduction and circumference by a feedback control. Furthermore, the optical mouse using the optical output system can work on various reflective surfaces.

DETAILED DESCRIPTION OF THE INVENTION

Figure 1:
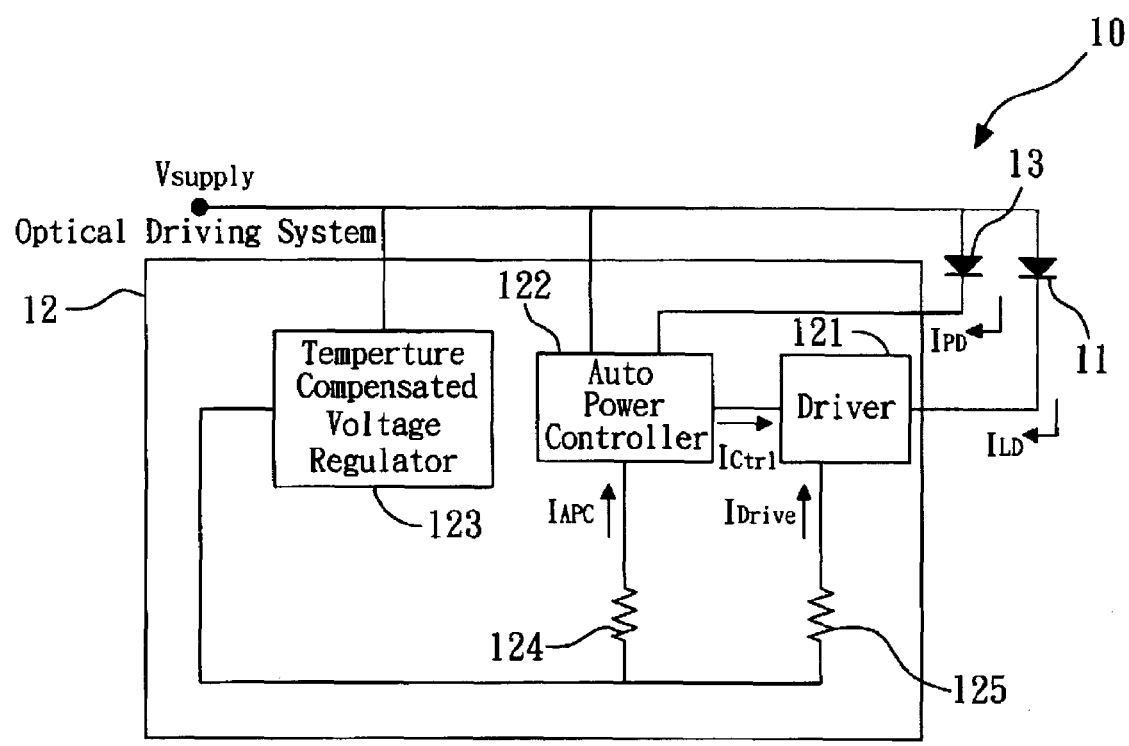
FIG. 1 shows an optical output system with auto optical power control for an optical mouse, according to a first embodiment of the invention.

Referring to FIG. 1, it shows an optical output system with auto optical power control for an optical mouse, according to a first embodiment of the invention. The optical output system 10 comprises: a light emitting device 11, a driver 121 and an auto power controller 122. The light emitting device 11 is used for generating emitting light. The light emitting device 11 may be a laser diode for outputting laser light. For safety demand, the output power of the laser light must be controlled to be below a predetermined maximum value, for example below 1 mW. Additionally, for stable resolution, the output power of the laser light must be controlled to be a predetermined value.

The driver 121 is used for driving the light emitting device 11. In the first embodiment of the invention, the driver 121 provides the light emitting device 11 with a controllable working current $I_{LD}$. The output power of the laser light is in proportional to the working current $I_{LD}$. Therefore, the output power of the laser light can be controlled by adjusting the working current $I_{LD}$.

The auto power controller 122 is used for outputting a control signal $I_{Ctrl}$ to the driver 121 according to at least one input signals, for example $I_{PD}$, so as to control the power of the light emitting device 11 at a predetermined range. The control signal $I_{Ctrl}$ can change the working current $I_{LD}$ of the driver 121. The input signals may be from various sensors which can detect factors and conditions to affect the power of the light emitting device 11. According to the input signals, the auto power controller 122 controls the driver 121 to output the corresponding working current to drive the light emitting device 11 so as to control the output power of the laser light.

In the first embodiment, the optical output system 10 further comprises a first photo detector 13 for receiving the emitting light of the light emitting device 11. The first photo detector 13 can be disposed near to the light emitting device 11, or on the path of the emitting light. Therefore, the first photo detector 13 can directly detect the power of the emitting light, and output a first corresponding photo input signal $I_{PD}$ to the auto power controller 122. According to the first corresponding photo input signal $I_{PD}$, the auto power controller 122 sends the control signal $I_{Ctrl}$ to the driver 121 to control the output power of the emitting light.

That is, when a real output power of the emitting light detected by the first photo detector 13 is larger than the predetermined value of the output power, the working current $I_{LD}$ must be decreased to lower the output power. On the other hand, when the real output power of the emitting light detected by the first photo detector 13 is smaller than the predetermined value of the output power, the working current $I_{LD}$ must be adjusted increasingly to raise the output power being equal to the predetermined value. Therefore, the output power of the emitting light can be controlled to be the predetermined value within the predetermined range.

The temperature drift of the auto power controller 122 and the driver 121 may affect the control for the output power, and we assume that the temperature drift of the photo detector 13 is tiny and can be neglected. Consequently, the optical output system 10 further comprises a temperature compensated voltage regulator 123 for providing a temperature compensated signal to the auto power controller 122 and the driver 121 respectively.

Furthermore, a first resistance 124 is disposed between the temperature compensated voltage regulator 123 and the auto power controller 122, and a second resistance 125 is disposed between the temperature compensated voltage regulator 123 and the driver 121. Therefore, the temperature compensated voltage regulator 123 can provide a first temperature compensated current $I_{APC}$ to the auto power controller 122, and provide a second temperature compensated current $I_{Driver}$ to the driver 121 so that the purpose of the temperature compensation can be obtained. The temperature compensation for the light emitting device 11 can be achieved by controlling the auto power controller 122.

The driver 121, the auto power controller 122, the temperature compensated voltage regulator 123, the first resistance 124 and the second resistance 125 can constitute an optical driving system 12 for driving the light emitting device 11. The optical driving system 12 can receive the first corresponding photo input signal $I_{PD}$ and control the output power of the emitting light.

Figure 2:
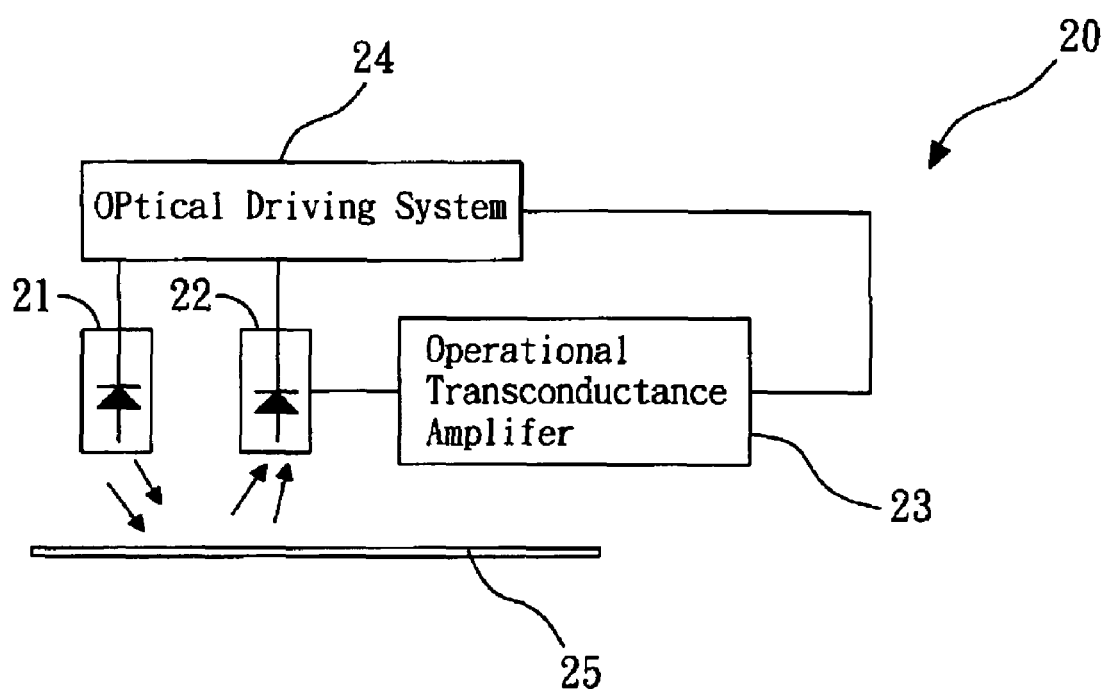
FIG. 2 shows an optical output system with auto optical power control for an optical mouse, according to the second embodiment of the invention.
Figure 3:
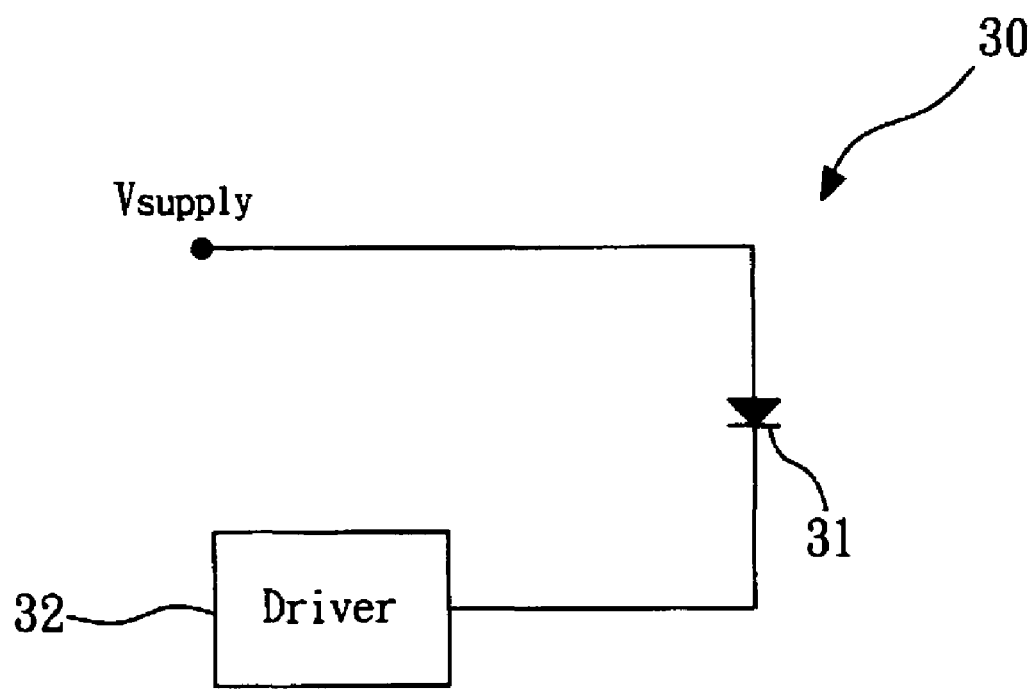
FIG. 3 shows a conventional optical output system for an optical mouse.

Referring to FIG. 2, it shows an optical output system with auto optical power control for optical mouse, according to a second embodiment of the invention. The optical output system 20 comprises: a light emitting device 21, a second photo detector 22, an operational transconductance amplifier 23 and an optical driving system 24. The light emitting device 21 and the optical driving system 24 are similar to those in the first embodiment, and will not be described again in detail.

The second photo detector 22 is used for receiving reflective light of a reflecting surface 25 and for outputting a second corresponding photo input signal to the auto power controller in the optical driving system 24. The reflective surface 25 is used for receiving the emitting light of the light emitting device 21 and reflecting the reflective light. The reflective surface 25 may be a surface of a table or a surface of a mouse pad, and the reflective characteristic of the reflective surface 25 depends on the material of the table or the mouse pad. According to the reflective characteristic of the reflective surface 25, the output power of the emitting light must be adjusted so as to let the optical mouse be able to work on any reflective surface. Therefore, in the second embodiment of the invention, the optical driving system 24 can output a corresponding working current to the light emitting device 21 to control the output power of the emitting light according to the second corresponding photo input signal from the second photo detector 22.

The operational transconductance amplifier 23 is disposed between the photo detector 22 and the auto power controller of the optical driving system 24. The operational transconductance amplifier 23 is used for processing the second corresponding photo input signal before the second corresponding photo input signal is input to the optical driving system 24.

Generally, the optical mouse must have a CMOS image sensor to obtain the image for determining the location of the optical mouse. The CMOS image sensor may have the function of the second photo detector. In other words, the CMOS image sensor can receive reflective light of a reflecting surface and output a second corresponding photo input signal to the optical driving system 24.

According to the invention, the optical output system can output the stable power of the emitting light at a predetermined value within the predetermined range under various conduction and circumference by a feedback control. Furthermore, the optical mouse using the optical output system can work on various reflective surfaces.

While an embodiment of the present invention has been illustrated and described, various modifications and improvements can be made by those skilled in the art. The embodiment of the present invention is therefore described in an illustrative, but not restrictive, sense. It is intended that the present invention may not be limited to the particular forms as illustrated, and that all modifications which maintain the spirit and scope of the present invention are within the scope as defined in the appended claims.

What is claimed is:

1. An optical output system with auto optical power control for an optical mouse, the optical output system comprising:
   a light emitting device, for generating emitting light;
   a driver, for driving the light emitting device;
   an auto power controller, for outputting a control signal to the driver according to at least one input signals so as to control the power of the light emitting device at a predetermined range;
   a temperature compensated voltage regulator for providing a temperature compensated signal to the auto power controller and the driver respectively; and
   a resistance disposed between the temperature compensated voltage regulator and the auto power controller, the temperature compensated voltage regulator providing a temperature compensated current to the auto power controller.

2. The optical output system according to claim 1, wherein the light emitting device is a laser diode.

3. The optical output system according to claim 1, wherein the driver provides the light emitting device with a controllable working current.

4. The optical output system according to claim 1, further comprising a photo detector for receiving the emitting light of the light emitting device and for outputting a corresponding photo input signal to the auto power controller.

5. The optical output system according to claim 1, further comprising a photo detector for receiving a reflective light of a reflecting surface and for outputting a corresponding photo input signal to the auto power controller.

6. The optical output system according to claim 5, wherein the reflective surface is used for receiving the emitting light of the light emitting device and reflecting the reflective light.

7. The optical output system according to claim 5, further comprising an operational transconductance amplifier disposed between the photo detector and the auto power controller.

8. The optical output system according to claim 5, wherein the photo detector is a CMOS image sensor.

9. The optical output system according to claim 1, further comprising a second resistance disposed between the temperature compensated voltage regulator and the driver, the temperature compensated voltage regulator providing a second temperature compensated current to the driver.

10. An optical output system with auto optical power control for an optical mouse, the optical output system comprising:
    a light emitting device, for generating emitting light;
    a driver, for driving the light emitting device;
    an auto power controller, for outputting a control signal to the driver according to at least one input signals so as to control the power of the light emitting device at a predetermined range;

a temperature compensated voltage regulator for providing a temperature compensated signal to the auto power controller and the driver respectively; and a resistance disposed between the temperature compensated voltage regulator and the driver, the temperature compensated voltage regulator providing a temperature compensated current to the driver.

11. The optical output system according to claim 10, wherein the light emitting device is a laser diode.

12. The optical output system according to claim 10, wherein the driver provides the light emitting device with a controllable working current.

13. The optical output system according to claim 10, further comprising a photo detector for receiving the emitting light of the light emitting device and for outputting a corresponding photo input signal to the auto power controller.

14. The optical output system according to claim 10, further comprising a photo detector for receiving a reflective light of a reflecting surface and for outputting a corresponding photo input signal to the auto power controller.

15. The optical output system according to claim 14, wherein the reflective surface is used for receiving the emitting light of the light emitting device and reflecting the reflective light.

16. The optical output system according to claim 14, further comprising an operational transconductance amplifier disposed between the photo detector and the auto power controller.

17. The optical output system according to claim 14, wherein the photo detector is a CMOS image sensor.

* * * * *

UNITED STATES PATENT AND TRADEMARK OFFICE
CERTIFICATE OF CORRECTION

PATENT NO. : 7,279,694 B2
APPLICATION NO. : 11/224017
DATED : October 29, 2007
INVENTOR(S) : Li-Huang Lai et al.

It is certified that error appears in the above-identified patent and that said Letters Patent is hereby corrected as shown below:

On the Title page, please change the home country of the fourth and fifth inventors:

Item (75)   Inventors:   Li-hung Lai, Taichuang (TW);
Wen-Sheng Hsieh, Taichuang (TW);
Wu-Chung Chiang, Taichuang (TW);
Yung-Jan HSU, Hsinchu [(CN)] --(TW)--;
Chang-Ching Yeh, Hsinchu [(CN)] --(TW)--

On the Title page, please change the spelling of the second Assignee::

Item (73)   Assignees:   Higher Way Electronics Co., Ltd., Taichuang (TW); [[Millenium]] --Millennium-- Communication Co., Ltd., Hsinchu Hsien (TW); Frontend Analog and Digital Technology Corporation, Hsinchu (TW)

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,279,694 B2  
APPLICATION NO. : 11/224017  
DATED : October 9, 2007  
INVENTOR(S) : Li-Huang Lai et al.

Page 1 of 1

It is certified that error appears in the above-identified patent and that said Letters Patent is hereby corrected as shown below:

On the Title page, please change the home country of the fourth and fifth inventors:

Item (75)   Inventors:   Li-hung Lai, Taichuang (TW);
                         Wen-Sheng Hsieh, Taichuang (TW);
                         Wu-Chung Chiang, Taichuang (TW);
                         Yung-Jan HSU, Hsinchu [(CN)] --(TW)--;
                         Chang-Ching Yeh, Hsinchu [(CN)] --(TW)--

On the Title page, please change the spelling of the second Assignee::

Item (73)   Assignees:   Higher Way Electronics Co., Ltd.,
                         Taichuang (TW); [[Millenium]] --Millennium--
                         Communication Co., Ltd., Hsinchu
                         Hsien (TW); Frontend Analog and
                         Digital Technology Corporation,
                         Hsinchu (TW)

This certificate supersedes the Certificate of Correction issued May 6, 2008.

Signed and Sealed this

Third Day of June, 2008

JON W. DUDAS  
*Director of the United States Patent and Trademark Office*